United States Patent
Aleman et al.

(10) Patent No.: US 10,439,434 B2
(45) Date of Patent: Oct. 8, 2019

(54) IMPEDANCE SHIFT ANALYSIS TO PREDICT FAILURES IN AN ELECTRICAL POWER DISTRIBUTION NETWORK

(71) Applicants: Florida Power & Light Company, Juno Beach, FL (US); WindLogics Inc., Juno Beach, FL (US)

(72) Inventors: Guillermo Aleman, Miami, FL (US); Eliud Perez, Royal Palm Beach, FL (US); Aaron J G Epel, Jupiter, FL (US)

(73) Assignee: Florida Power & Light Company, Juno Beach, FL (US)

( * ) Notice: Subject to any disclaimer, the term of this patent is extended or adjusted under 35 U.S.C. 154(b) by 260 days.

(21) Appl. No.: 15/454,556

(22) Filed: Mar. 9, 2017

(65) Prior Publication Data

US 2017/0264139 A1  Sep. 14, 2017

Related U.S. Application Data

(60) Provisional application No. 62/305,551, filed on Mar. 9, 2016.

(51) Int. Cl.
*H02J 13/00* (2006.01)
*H02J 3/00* (2006.01)

(52) U.S. Cl.
CPC .......... *H02J 13/0062* (2013.01); *H02J 3/005* (2013.01); *H02J 2003/007* (2013.01); *Y02E 60/76* (2013.01); *Y02E 60/7838* (2013.01); *Y04S 40/124* (2013.01); *Y04S 40/22* (2013.01)

(58) Field of Classification Search
CPC ... G01R 27/16; G01R 31/085; H02J 13/0062; H02J 3/005; H02J 2003/007; Y02E 60/76; Y02E 60/7838; Y04S 40/124; Y04S 40/22
See application file for complete search history.

(56) References Cited

U.S. PATENT DOCUMENTS 4,550,223 A * 10/1985 Poitevin ................ H04M 3/301
 361/106
2004/0138865 A1 * 7/2004 Hsiao ................... G06F 17/5036
 703/14

(Continued)

*Primary Examiner* — Kyle R Quigley
(74) *Attorney, Agent, or Firm* — Tarolli, Sundheim, Covell & Tummino, LLP

(57) ABSTRACT

Embodiments of the present invention provide for impedance shift analysis for failure prediction in an electrical power distribution network. In an embodiment of the invention, the method includes receiving a sequence of electrical measurements indicative of an impedance measured for a segment of an electrical power distribution network over a period of time. Then, a set of impedance measurements is computed for the period of time and the set of impedance measurements is organized into a distribution correlating each one of the impedance measurement with a corresponding computed current measurement. A trend line for the distribution is identified and a slope computed of the trend line. Finally, on condition that the slope exceeds a threshold steepness, an impending failure in the segment is determined and a notification transmitted over a computer communications network to an end user requesting physical inspection of the segment.

20 Claims, 3 Drawing Sheets

(56) References Cited

U.S. PATENT DOCUMENTS

2009/0115427 A1\* 5/2009 Radtke .................. G01R 27/16
324/629
2015/0241488 A1\* 8/2015 Sonderegger ........ G01R 22/066
702/65

\* cited by examiner

IMPEDANCE SHIFT ANALYSIS TO PREDICT FAILURES IN AN ELECTRICAL POWER DISTRIBUTION NETWORK

CROSS-REFERENCE TO RELATED APPLICATION

This application claims the benefit under 35 U.S.C. § 119(e) of U.S. Provisional Patent Application No. 62/305,551 filed on Mar. 9, 2016 and entitled IMPEDANCE CLOUD SHIFT ANALYSIS TO PREDICT FAILURES, the entire teachings of which are incorporated herein by reference.

BACKGROUND OF THE INVENTION

Field of the Invention

The present invention relates to failure prediction on an electrical power distribution network.

Description of the Related Art

An electrical power distribution network is an interconnected network for delivering electricity from suppliers to consumers. An electrical power distribution network generally includes a power grid defined by one or more electrical power generating stations that produce electrical power, high-voltage transmission lines that carry the generated power from the point of generation to demand centers, and distribution lines that connect individual customers so that those customers may receive and consume the electrical power generated originally in the generating stations. Intermediate to the distribution lines and the high-voltage transmission lines are sub-stations. Sub-stations "step down" the power from the very high voltage of the transmission line to a lower distribution voltage suitable for distribution to customers, and one or more feeder backbones each served by a feeder breaker to further distribute power from each substation to different lateral branches to which the individual customers are coupled by transformers that even further step down the power to a service level voltage.

The power lines of an electrical power distribution network support many devices which are prone to random failure such as, wire splices, overhead disconnect switches and underground elbow terminations. At the onset of a typical failure in a device, an impedance experienced at the failing device increases resulting in an increase in temperature, which in turn further increases the impedance and so forth. This condition, known as "thermal runaway" ultimately results in the complete failure of the device and an outage of power to an affected premise.

Overhead splices have been routinely used in the power grid, including in the different feeder backbones, well before the advent of the smart grid and smart meters. Often the organization responsible for the power grid may not have an accurate indication of a number and placement of overhead splices in a feeder backbone. Notably, in the case of an overhead splice, a failure occurring as a result of thermal runaway may cause a line break and a live power line falling and contacting the ground—a very dangerous and potentially fatal condition.

BRIEF SUMMARY OF THE INVENTION

Embodiments of the present invention address deficiencies of the art in respect to failure prediction and provide for impedance shift analysis for failure prediction in an electrical power distribution network. In an embodiment of the invention, a method for impedance shift analysis for failure prediction in an electrical power distribution network includes receiving a sequence of electrical measurements indicative of an impedance measured for a segment of an electrical power distribution network over a period of time. Then, a set of impedance measurements is computed for the period of time and the set of impedance measurements is organized into a distribution correlating each one of the impedance measurement with a corresponding current derived from kilowatt hour measurements. A trend line for the distribution is identified and a slope computed of the trend line. Finally, on condition that the slope exceeds a threshold steepness, an impending failure in the segment is determined and a notification transmitted over a computer communications network to an end user requesting physical inspection of the segment.

In one aspect of the embodiment, the sequence of electrical measurements are voltage and kilowatt hour measurements received from an upstream electrical meter disposed at a portion of the segment closest to a sub-station and from a downstream electrical meter disposed at a portion of the segment furthers from the sub-station. As such, each impedance value for the segment is a quotient of a difference between contemporaneously measured voltage values at the upstream and downstream electrical meters, and a current contemporaneously derived from the kilowatt hour measurements for the segment. Finally, it bears noting that the upstream electrical meter and the downstream electrical meter may communicate with one another over a mesh network coupled to the computer.

In another embodiment of the invention, an electrical power distribution network is configured for impedance shift analysis for failure prediction. The network includes a computer with memory and at least one processor that hosts the execution of a failure prediction module. The network also includes a substation distributing electrical power, and a feeder having a feeder segment with an upstream end closest to the substation and a downstream end further from the substation than the upstream end. The feeder segment in turn demonstrates a measureable impedance. Finally, the network includes a multiplicity of electrical meters coupled to the feeder and measuring electrical consumption at respective premises end points of the network. In this regard the meters periodically report to the failure prediction module a sequence of electrical measurements indicative of the measurable impedance for the feeder segment;

The failure prediction module includes program code that when executed in the computer computes a set of impedance measurements for a period of time, organizes the set of impedance measurements into a distribution correlating each one of the impedance measurements with a corresponding computed current measurement, identifies a trend line for the distribution and computes a slope of the trend line, and on condition that the slope exceeds a threshold steepness, determines that a failure is impending in the feeder segment and transmits a notification over a computer communications network to an end user requesting physical inspection of the feeder segment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for impedance shift analysis for failure prediction in an electrical power distribution network. Impedance may be substantially static at any given point as it is a property of the conductor material and length. The impedance may be dynamic, having an exponential relationship with inductance and capacitance per unit length of conductor. The behavior of impedance as a function of voltage and load or current over time may detect material changes indicative of pending adverse resistive events on a distribution line in the electrical power distribution network. In accordance with an embodiment of the invention, the impedance of different segments of different portions of an electrical power distribution network are measured at different intervals of time for a duration of time by different electrical meters at the different segments. But, in so far as oftentimes the measurements may be received from the electrical meters asynchronously, the measurements are processed based upon a statistical analysis of voltage and kilowatt hour measurements collected from the electrical meters during the different intervals. Thereafter, changes in the computed impedance for each of the different segments over one of the intervals of time are measured and, for measured changes beyond a threshold for a corresponding one of the different segments during a particular period of time, an alert is generated by the processor of the computer and a dispatch message transmitted from the computer over a computer communications network to an end user indicating a need to physically inspect the corresponding one of the different segments. The end user is typically a repair service associated with a utility maintaining the power distribution network. The alert may take the form of a ticket used to generate a manned truck roll resulting in the physical inspection of the line. Since the locations of meters involved in the alert generation is known, the ticket may further include a limited area for inspection of the power distribution network based upon the known locations of the involved meters, thereby not only predicting a failure before its occurrence, but also reducing the time invested in locating the predicted failure.

Figure 1:
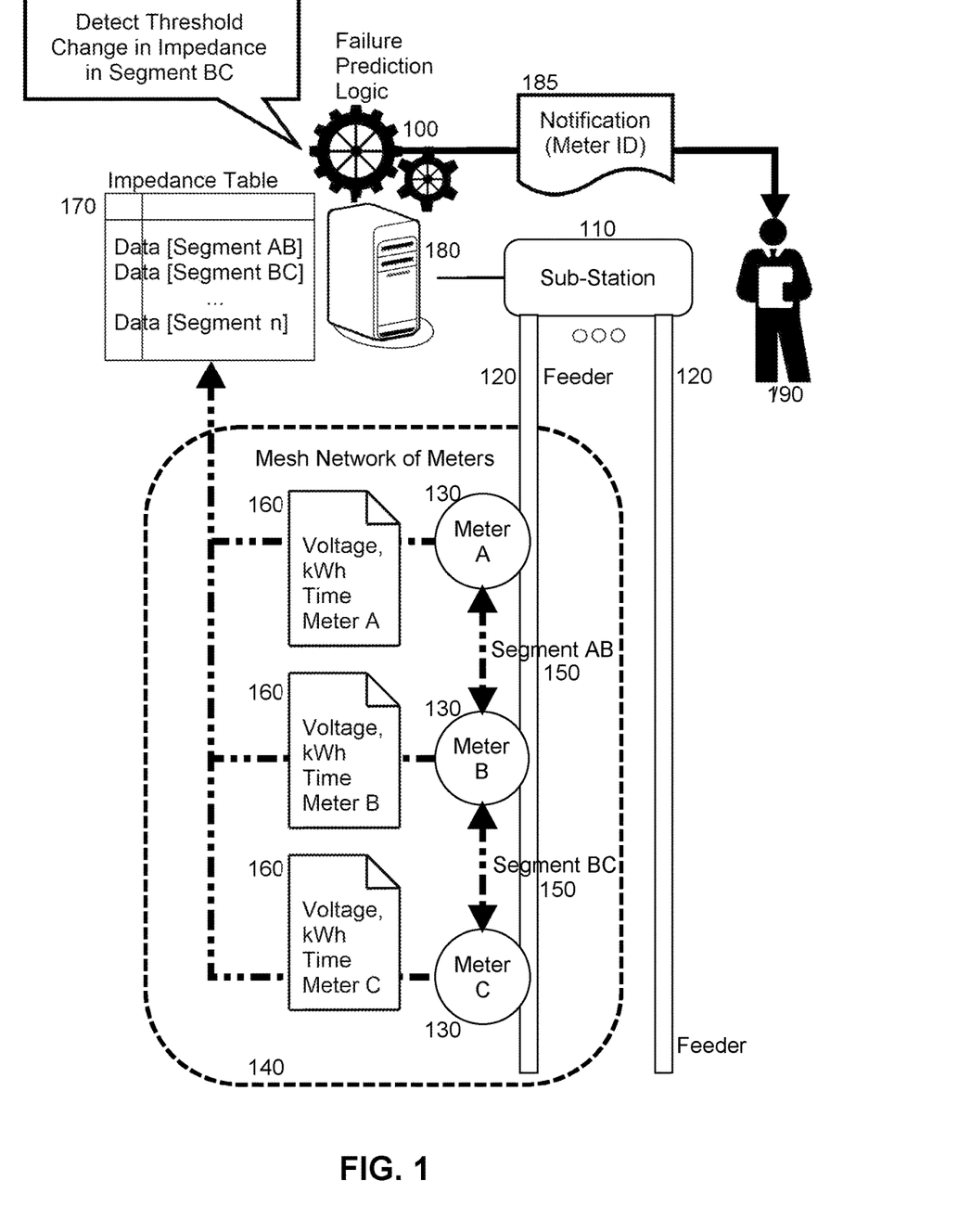
FIG. 1 is a pictorial illustration of a process for impedance shift analysis for failure prediction in an electrical power distribution network.

In further illustration, FIG. 1 pictorially depicts of a process for impedance shift analysis for failure prediction in an electrical power distribution network. As shown in FIG. 1, different feeders 120 extend from a sub-station 110. A mesh network 140 of electrical meters 130 define different segments 150 of a corresponding one of the feeders 120, each of the different segments 150 being defined by an upstream-downstream pair of the electrical meters 130. Each of the electrical meters 130 periodically collects electrical data 160 measured therein, including a contemporaneous voltage and kilowatt hour, a date and time of the measurement and an identification of the one of the electrical meters 130 collecting the electrical data 160. The electrical data 160 is then propagated through the mesh network 140 to a computer 180 wherein the electrical data 160 is stored in a table 170 from which impedance values are computed for instances in time for the different segments 150 based upon the electrical data 160. The impedance values generally are computed as a function of a differential of voltage values between two of the electrical meters 130 in sequence defining a corresponding one of the different segments 150 divided by a computed current measurement for the corresponding one of the different segments.

Failure prediction logic 100 executes in the memory of the computer 180 and processes the electrical data 160 in the impedance table 170 for those of the electrical meters 130 known to have a load associated therewith. To the extent that one of the electrical meters 130 lacks a load, data from the one of the electrical meters 130 lacking the load is replaced by data from a different one of the electrical meters 130 having a load associated therewith. In particular, failure prediction logic 100 selects a period of time and processes the impedance based measurements of each of the different segments 150 for the selected period of time. A change in the impedance based measurements for each of the different segments 150 is then computed. For instance, the change in the impedance based measurements may be computed based upon a difference between a maximum one of the impedance based measurements and a minimum one of the impedance based measurements over the selected period of time. As another example, the change in the impedance based measurements may be computed based upon the organization of the impedance based measurements into a distribution during the selected period of time in correlation with corresponding computed current measurements, the identification of a trend line for the distribution and the computation of a slope of the trend line.

To the extent that the failure prediction logic 100 computes a threshold change in the impedance based measurements over the period of time for a particular one of the different segments 150, or in the latter circumstance, a threshold steepness of the computed slope of the trend line, the failure prediction logic 100 then generates and transmits a notification to an end user 190 directing the end user 190 to physically inspect a portion of feeder 120 bounded by upstream-downstream pairs of the electrical meters 130 for the particular one of the segments 150 associated with the threshold change as the computed threshold change in the impedance based measurement during the selected period of time is interpreted by the failure prediction logic 100 as being indicative of thermal runaway.

Figure 2:
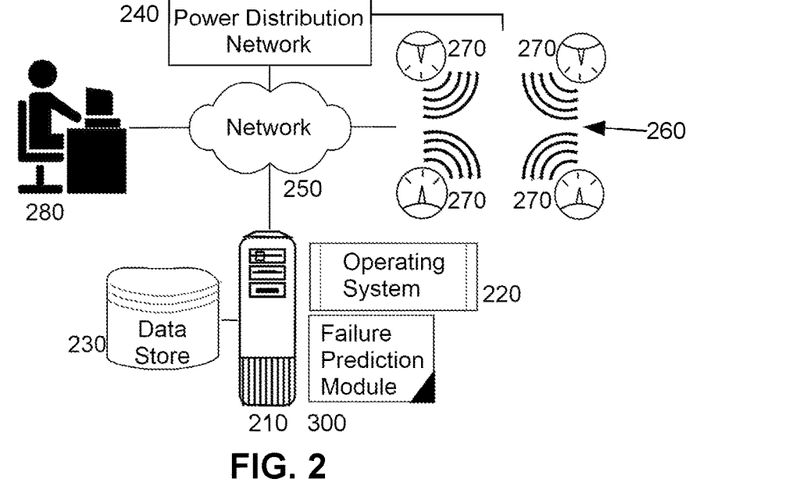
FIG. 2 is a schematic illustration of a data processing system configured for impedance shift analysis for failure prediction in an electrical power distribution network.

The process described in connection with FIG. 2 may be implemented in a data processing system. In yet further illustration, FIG. 2 schematically shows a data processing system configured for impedance shift analysis for failure prediction in an electrical power distribution network. The system includes a host computing platform 210 of one or more computers, each with memory and at least one processor. The host computing platform 210 is communicatively coupled over computer communications network 250 to a mesh network 260 of electrical meters 270 disposed about different feeders in a power distribution network 240. Each of the electrical meters 270 in the mesh network 260 propagate through the mesh network 260 contemporaneously measured values of voltage and kilowatt hour. Consequently, impedance based measurements may be computed for each segment of a feeder during a specified period of time based upon the asynchronously collected voltage and kilowatt hour measurements at upstream-downstream pairs of the electrical meters 270 defining each segment of the feeder.

Exemplary impedance based measurements include a distribution of impedance values to current values over a specified period of time. Another exemplary impedance based measurement includes the identification of the quotient of the difference between voltage measurements of an upstream and downstream pair of the electrical meters 270 and the computed current measured there between. Yet another exemplary impedance based measurement includes computing an average for collected voltages over an initial portion of the specified period of time for each of the pair of electrical meters 270 and to compute an average voltage and current measurement for subsequent portion of the specified period of time at each of the electrical meters 270 in the pair and then to compute the quotient of the difference between the average voltage measurements of the upstream and downstream pair of the electrical meters 270 and the average computed current measured there between. Even yet another exemplary impedance based measurement includes a ratio of a difference between the voltage values of the upstream and downstream pair of electrical meters 270 to a sum of computed current values of the downstream meter one of the electrical meters 270 and additional downstream electrical meters 270.

Of note, an operating system 220 of the host computing platform 210 hosts the execution of a failure prediction module 300 operating upon collected data in a data store 230. The failure prediction module 300 includes computer readable program code of a computer program product that when executed by one or more processors in the memory of the host computing platform 210, is enabled to compute changes between impedance based measurements for different segments of different feeders of the power distribution network 240 over a specified period of time in reference to voltage and computed current measurements stored in the data store 230. The program code in particular monitors the data in the data store 230 to detect the condition when a threshold change in an impedance based measurement has occurred during the specified period of time in respect to a segment of a feeder. In response to detecting such a condition, the program code then generates and transmits a notification to an end user 280 directing a physical inspection of the segment for which the threshold change in the impedance based measurement is detected.

Figure 3:
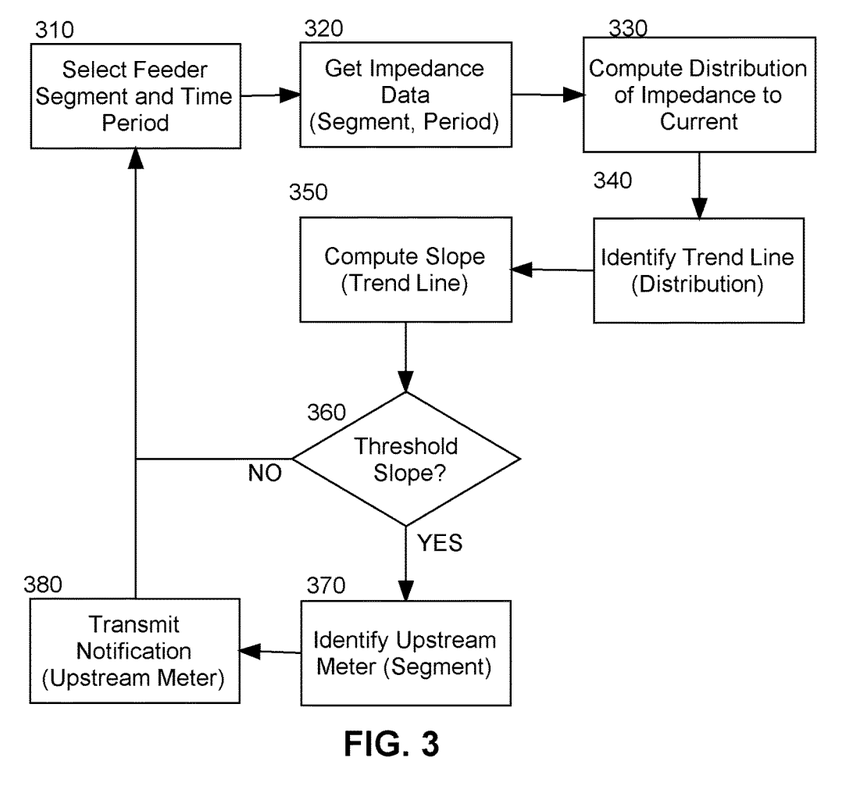
FIG. 3 is a flow chart illustrating a process for impedance shift analysis for failure prediction in an electrical power distribution network; and, FIG. 4 is a pictorial illustration of an exemplary graphical distribution of impedance versus current measurement over two different periods of time for a segment of the electrical power distribution network of FIG. 1 from which a slope of a trend line is computed to indicate an impending thermal runaway condition in the segment.

In even yet further illustration of the operation of the failure prediction module, FIG. 3 is a flow chart illustrating a process for impedance shift analysis for failure prediction in an electrical power distribution network. Beginning in block 310, a first feeder segment of a feeder is selected for analysis along with a specified period of time, and in block 320, previously collected voltage and current data is retrieved from a data store in connection with the selected segment and specified period of time. In block 330, one or more impedance values for the segment during the specified period of time are computed and organized into a distribution for corresponding current values for each of the impedance values. Then, in block 340 a trend line is identified for the distribution and in block 350, a slope is computed for the identified trend line. In this regard, and by way of example, in reference to FIG. 4, a first distribution 410 of impedance values for a first feeder segment of the feeder is shown plotted against corresponding current values. From the first distribution 410, a trend line 420 may be identified or computed using any well known technique, for instance by computing a line situated at a minimal distance from each data point in the distribution 410 with the trend line 420 passing through as many data points as possible, so that the number of data points points falling above and below the trend line 420 is roughly equal. Then, a slope $\Theta$ of the trend line 420 is readily computed.

Figure 4:
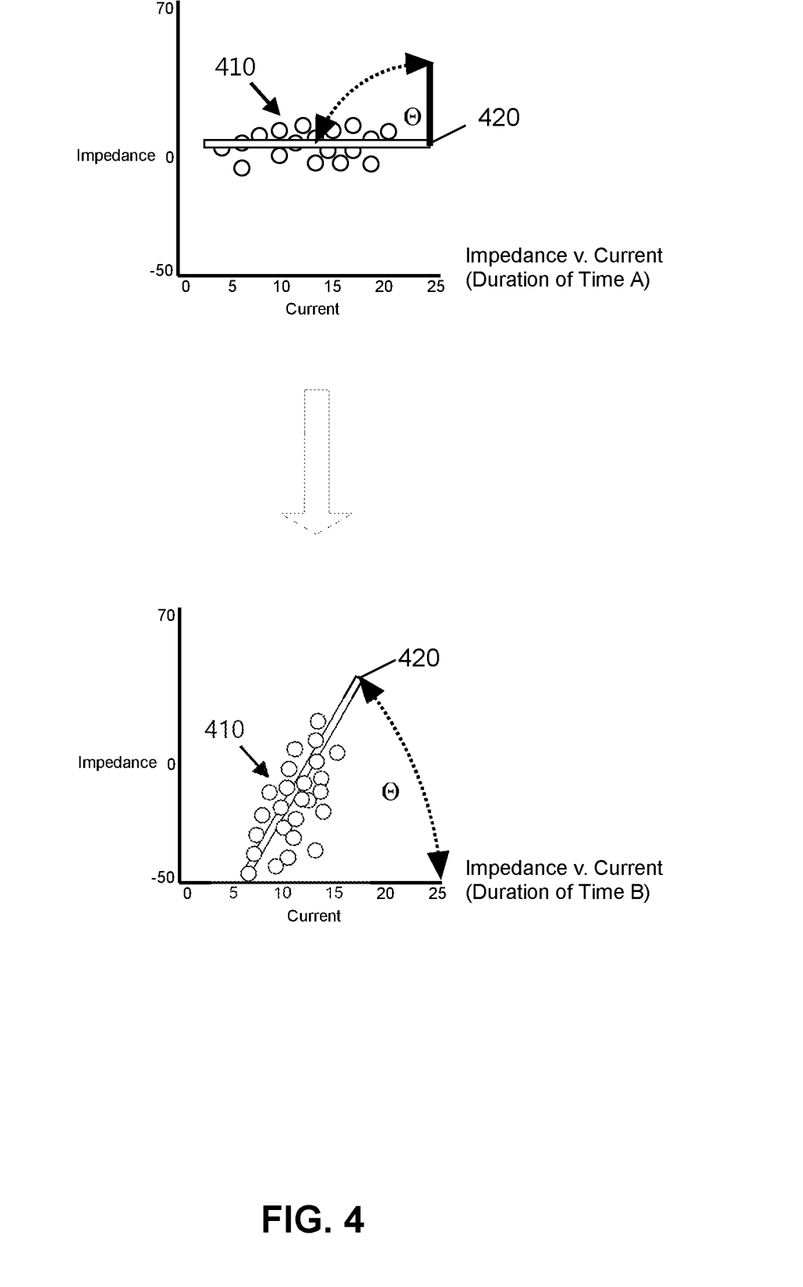

Returning now to FIG. 3 with reference to FIG. 4, in decision block 360, if a threshold steepness of the computed slope $\Theta$ exceeds a threshold, in block 370 an upstream-downstream meter pair defining a feeder particular segment is identified and in block 380, a notification is transmitted to an operator directing a physical inspection at the particular segment. But otherwise, no action is taken. Thereafter, in block 310 a next feeder segment of the feeder is selected for analysis and the process continues through block 320.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for impedance shift analysis for failure prediction in an electrical power distribution network, the method comprising:

receiving in memory of a computer, a sequence of electrical measurements indicative of an impedance measured for a segment of an electrical power distribution network over a period of time;

computing by a processor of the computer a set of impedance measurements for the period of time, organizing the set of impedance measurements into a distribution correlating each one of the impedance measurement with a corresponding computed current measurement, identifying a trend line for the distribution and computing a slope of the trend line; and, on condition that the slope exceeds a threshold steepness, determining by the processor of the computer that a failure is impending in the segment and transmitting a notification over a computer communications network to an end user requesting physical inspection of the segment.

2. The method of claim 1, wherein the sequence of electrical measurements are voltage and kilowatt hour values received over the period of time from an upstream electrical meter disposed at a portion of the segment closest to a sub-station and from a downstream electrical meter disposed at a portion of the segment furthers from the sub-station.

3. The method of claim 2 further comprising determining if both the upstream and downstream electrical meters have a load associated therewith selecting an alternate meter with a load associated therewith to replace one of the upstream or downstream electrical meters if one of the upstream or downstream electrical meters are determined not to have a load associated therewith.

4. The method of claim 2, wherein each impedance value for the segment is a quotient of a difference between contemporaneously measured voltage values at the upstream and downstream electrical meters, and a computed current contemporaneously measured for the segment.

5. The method of claim 4, wherein the current is derived from the kilowatt hour values provided by the upstream and downstream meters.

6. The method of claim 2, wherein the notification requests dispatch to the upstream-downstream electrical meter pair encompassing a particular segment.

7. The method of claim 2, wherein the upstream electrical meter and the downstream electrical meter communicate over a mesh network coupled to the computer.

8. An electrical power distribution network configured for impedance shift analysis for failure prediction, the network comprising:

a computer comprising memory and at least one processor and hosting the execution of a failure prediction module;

a substation distributing electrical power;

a feeder having a feeder segment with an upstream end closest to the substation and a downstream end further from the substation than the upstream end, the feeder segment demonstrating a measurable impedance; and, a multiplicity of electrical meters coupled to the feeder and measuring electrical consumption at respective premises end points of the network, the meters periodically reporting to the failure prediction module a sequence of electrical measurements indicative of an impedance measured for a segment of an electrical power distribution network;

the failure prediction module comprising program code that when executed in the computer computes a set of impedance measurements for a period of time, organizes the set of impedance measurements into a distribution correlating each one of the impedance measurement with a corresponding computed current measurement, identifies a trend line for the distribution and computes a slope of the trend line, and on condition that the slope exceeds a threshold steepness, determines that a failure is impending in the feeder segment and transmits a notification over a computer communications network to an end user requesting physical inspection of the feeder segment.

9. The system of claim 8, wherein the sequence of electrical measurements are voltage and kilowatt hour values received from an upstream one of the electrical meters disposed at the upstream end and from a downstream one of the electrical meters disposed at the downstream end.

10. The system of claim 9, wherein each impedance value for the segment is a quotient of a difference between contemporaneously measured voltage values at the upstream and downstream electrical meters, and a computed current contemporaneously measured for the segment.

11. The system of claim 10, wherein the current is derived from the kilowatt hour values provided by the upstream and downstream meters.

12. The system of claim 9, wherein the notification requests dispatch to the upstream-downstream pair of the electrical meters encompassing the particular feeder segment.

13. The system of claim 9, wherein the upstream one of the electrical meters and the downstream one of the electrical meters communicate over a mesh network coupled to the computer.

14. A computer program product for impedance shift analysis for failure prediction in an electrical power distribution network, the computer program product comprising a computer readable storage, non-transitory medium having program instructions embodied therewith, the program instructions executable by a device to cause the device to perform a method comprising:

receiving a sequence of electrical measurements indicative of an impedance measured for a segment of an electrical power distribution network over a period of time;

computing a set of impedance measurements for the period of time, organizing the set of impedance measurements into a distribution correlating each one of the impedance measurement with a corresponding computed current measurement, identifying a trend line for the distribution and computing a slope of the trend line; and, on condition that the slope exceeds a threshold steepness, determining by the processor of the computer that a failure is impending in the segment and transmitting a notification over a computer communications network to an end user requesting physical inspection of the segment.

15. The computer program product of claim 14, wherein the sequence of electrical measurements are voltage and kilowatt hour values received from an upstream electrical meter disposed at a portion of the segment closest to a sub-station and from a downstream electrical meter disposed at a portion of the segment furthers from the sub-station.

16. The computer program product of claim 15 further comprising determining if both the upstream and downstream electrical meters have a load associated therewith; and selecting an alternate meter with a load associated therewith to replace one of the upstream or downstream electrical meters if one of the upstream or downstream electrical meters are determined not to have a load associated therewith.

17. The computer program product of claim 14, wherein each impedance value for the segment is a quotient of a difference between contemporaneously measured voltage values at the upstream and downstream electrical meters, and a computed current contemporaneously measured for the segment.

18. The computer program product of claim 16, wherein the current is derived from the kilowatt hour values provided by the upstream and downstream meters.

19. The computer program product of claim 15, wherein the notification requests dispatch to the upstream-downstream electrical meters encompassing the particular feeder segment.

20. The computer program product of claim 15, wherein the upstream electrical meter and the downstream electrical meter communicate over a mesh network coupled to the computer.

* * * * *

UNITED STATES PATENT AND TRADEMARK OFFICE
CERTIFICATE OF CORRECTION

PATENT NO. : 10,439,434 B2
APPLICATION NO. : 15/454556
DATED : October 8, 2019
INVENTOR(S) : Guillermo Aleman et al.

It is certified that error appears in the above-identified patent and that said Letters Patent is hereby corrected as shown below:

On the Title Page

Item (71) Applicants:
Reads "Florida Power & Light Company, Juno Beach, FL (US)"
Should read --Florida Power & Light Company, Juno Beach, FL (US); Inventus Holdings, LLC, Juno Beach, FL (US)--

Signed and Sealed this
Nineteenth Day of November, 2019

Andrei Iancu
*Director of the United States Patent and Trademark Office*